(12) United States Patent
Kupsh et al.

(10) Patent No.: US 7,149,537 B1
(45) Date of Patent: Dec. 12, 2006

(54) METHOD AND SYSTEM FOR GENERATING A USER-ACCESSIBLE INTERNET-BASED MOBILE MESSAGING LOG

(75) Inventors: Jerry Kupsh, Concord, CA (US); Kevin Lim, Danville, CA (US)

(73) Assignee: Cellco Partnership, Bedminster, NJ (US)

( * ) Notice: Subject to any disclaimer, the term of this patent is extended or adjusted under 35 U.S.C. 154(b) by 466 days.

(21) Appl. No.: 10/074,586

(22) Filed: Feb. 12, 2002

(51) Int. Cl.
*H04Q 7/22* (2006.01)
*H04M 11/10* (2006.01)
*H04L 12/66* (2006.01)

(52) U.S. Cl. ............... 455/466; 455/413; 455/566; 455/412.1; 455/412.2; 370/352; 370/363

(58) Field of Classification Search ........... 455/466, 455/403, 445, 412, 414, 416, 517, 413, 566, 455/38.1, 38.2, 567, 415, 38.4; 340/825.44; 709/219, 206, 313; 370/352
See application file for complete search history.

(56) References Cited

U.S. PATENT DOCUMENTS

| | | | | |
|---|---|---|---|---|
| 6,078,820 A * | 6/2000 | Wells et al. | ................. | 455/466 |
| 6,085,100 A * | 7/2000 | Tarnanen | ..................... | 455/466 |
| 6,101,393 A * | 8/2000 | Alperovich et al. | ........ | 455/466 |
| 6,246,871 B1 * | 6/2001 | Ala-Laurila | ................. | 455/413 |
| 6,321,257 B1 * | 11/2001 | Kotola et al. | ............... | 709/219 |
| 6,370,389 B1 * | 4/2002 | Isomursu et al. | ........... | 455/466 |
| 6,519,468 B1 * | 2/2003 | Donovan et al. | ........... | 455/466 |
| 6,560,456 B1 * | 5/2003 | Lohtia et al. | ............... | 455/445 |
| 2001/0041560 A1 * | 11/2001 | Tarkiainen et al. | ......... | 455/414 |
| 2002/0029189 A1 * | 3/2002 | Titus et al. | .................... | 705/39 |
| 2002/0086689 A1 * | 7/2002 | Moran et al. | ............... | 455/466 |
| 2002/0159387 A1 * | 10/2002 | Allison et al. | .............. | 370/229 |
| 2002/0173319 A1 * | 11/2002 | Fostick | ........................ | 455/466 |
| 2003/0003935 A1 * | 1/2003 | Vesikivi et al. | ............. | 455/517 |
| 2003/0083078 A1 * | 5/2003 | Allison et al. | .............. | 455/466 |
| 2004/0082347 A1 * | 4/2004 | Alminana et al. | .......... | 455/466 |
| 2005/0185634 A1 * | 8/2005 | Benco et al. | ............... | 370/352 |

OTHER PUBLICATIONS

Short Message Peer to Peer Protocol Specification v3.4, Document Version:-Oct. 12, 1999, Issue 1.2, pp. 1 through 169.
3rd Generation Partnership Project 2, "3GPP2", Short Message Service, pp. 1 through 4-41 (TIA/EIA-637-A) (1999).
TIA/EIA Standard, Short Message Services for Wideband Spread Spectrum Systems, Dated: Jan. 31, 2002, pp. 1 through 4-55.

* cited by examiner

*Primary Examiner*—Joseph Feild
*Assistant Examiner*—Julio Perez
(74) *Attorney, Agent, or Firm*—Darby & Darby

(57) ABSTRACT

A system and method for providing a user-accessible Internet-based mobile messaging log that records messages communicated between an Internet-based sending device and an SMS-capable mobile device. An SMS messaging log is created for each Internet-based user that sends messages to SMS-capable mobile devices. The mobile user is then able to access their SMS messaging log via the Internet and view the SMS messages sent to the SMS-capable device. The message log also records and displays replies sent by the SMS-based user in response to the sent message. The system and method utilize a unique tracking identification number to match original messages to replies in the mobile messaging log.

12 Claims, 3 Drawing Sheets

FIG. 3

Message Log for Jim Smith

| Message | Sent | Recipient | Status | Delivered | Reply |
|---|---|---|---|---|---|
| Lunch Today? | 7/16/2001 11:00 AM | 215-555-5551 | Message Delivered | 7/16/2001 11:05 AM | OK |
| Are You Feeling Better Today? | 7/16/2001 11:32 AM | Joe Jones | Message Delivered | 7/16/2001 11:33 AM | Much Better, Thanks |
| Where did You Leave The Keys? | 7/16/2001 12:23 PM | Sue Brown | Message Delivered | 7/16/2001 12:25 PM | |

METHOD AND SYSTEM FOR GENERATING A USER-ACCESSIBLE INTERNET-BASED MOBILE MESSAGING LOG

FIELD OF THE INVENTION

The present invention generally relates to mobile communication systems. More specifically, this invention relates to messaging over mobile communications systems and maintenance of a user-accessible log of messaging activity.

BACKGROUND OF THE INVENTION

One of the most popular communication technologies that has developed for mobile communications systems is the Short Message Service (SMS), which allows mobile users to communicate with other users via wireless communication devices including SMS-capable cellular mobile phones. Mobile users can send short text messages to other users by entering a text message and the destination address of a recipient user, who can be either a mobile or non-mobile user. The SMS system will transmit the text message as an SMS message from the mobile user to the recipient user. Similarly, a sender, who can also be mobile or non-mobile, can send SMS messages to a mobile user by entering a mobile user's address and the text message to be sent, after which the SMS system transmits the text message from the sender to the mobile user recipient. Thus, for an SMS system, either the sender or the recipient may be a mobile user, and non-mobile users may send SMS messages to and receive SMS messages from mobile users.

Based on the ability to send short text messages via SMS, a number of electronic information services have been developed around SMS technology. For instance, SMS has integrated a number of services including e-mail and fax, paging, interactive banking, and general information services such as providing financial information. Thus, SMS is not limited to transmitting simple text messages between mobile users, but has developed into a general system for wireless communication of electronic information between a mobile user and other users or networked computer systems that use SMS to send and receive messages to and from SMS-capable devices. As a result, an SMS message may include not only text messages entered by mobile and non-mobile users, but may also include e-mail, fax, paging, financial, news, and other electronic information.

It is presently known that personal computers or other Internet-accessible devices can send text messages to SMS-capable mobile devices via a web browser. As an example, Verizon Wireless® allows Internet users to access its web site and type a message intended for one of its subscribers. The Internet user then enters an identifier, e.g., telephone number or predefined user name, to identify the recipient subscriber. Upon submission, the message is sent to the SMS network via an Internet gateway.

It is also known that the SMS network allows message recipients to send a reply in response to a received SMS message.

When electronic information is communicated between a sender, e.g., an Internet-enabled personal computer, and a mobile user via SMS, it may be desirable to record the SMS communicated messages so that the sender may subsequently view a record of all the SMS messages he has sent as well as the respective replies to the messages. It would be preferable that the record of SMS messages be provided in a user-friendly format that is easily accessible to the sender.

SUMMARY

The need to record, retrieve and review messages sent to SMS-capable mobile devices by an Internet-based computer in a convenient, user-friendly manner are addressed by the present invention, which is directed to a method and system for generating a user-accessible Internet-based mobile messaging log. The present invention creates a mobile messaging log that includes the messages communicated between an Internet-based user and an SMS-capable device.

The inventive method includes the steps of: (1) receiving a message destined for a mobile device at a gateway; (2) assigning a unique identifier to the received message; (3) recording the received message and unique identifier in a database; and (4) forwarding the received message from the gateway to the mobile device. The forwarded message sent from the gateway to the mobile device includes an origination address, which is derived from the unique identifier. Additional steps may include: (5) receiving, at the gateway, a reply to the message from the mobile device; (6) correlating the reply to the sent message; and (7) recording the correlated reply in the database. The user may then access the message and reply recorded in the database, preferably using an Internet connection and a web interface.

The inventive system includes: (1) first and second communication devices connected respectively to first and second networks, (2) a database, and (3) a gateway connected to the first and second networks. The gateway receives each of a plurality of messages sent from the first communication device destined for the second communication device, assigns a unique identifier to each message, and records each message and identifier in the database. The gateway then forwards the message to the second communication device connected to the second network. The origination address of the forwarded message is derived from the unique identifier. The first communication device is preferably an Internet-based personal computer connected to the gateway via the Internet. The gateway provides a web interface to the Internet-based user to allow the user to retrieve and review the messages stored in the database.

BRIEF DESCRIPTION OF THE DRAWINGS

The foregoing and other features of the present invention will be more readily apparent from the following detailed description and drawings of illustrative embodiments of the invention in which:

FIG. 3 illustrates a web page containing an exemplary message log for a particular user.

DETAILED DESCRIPTION OF AN EMBODIMENT OF THE INVENTION

Figure 1:
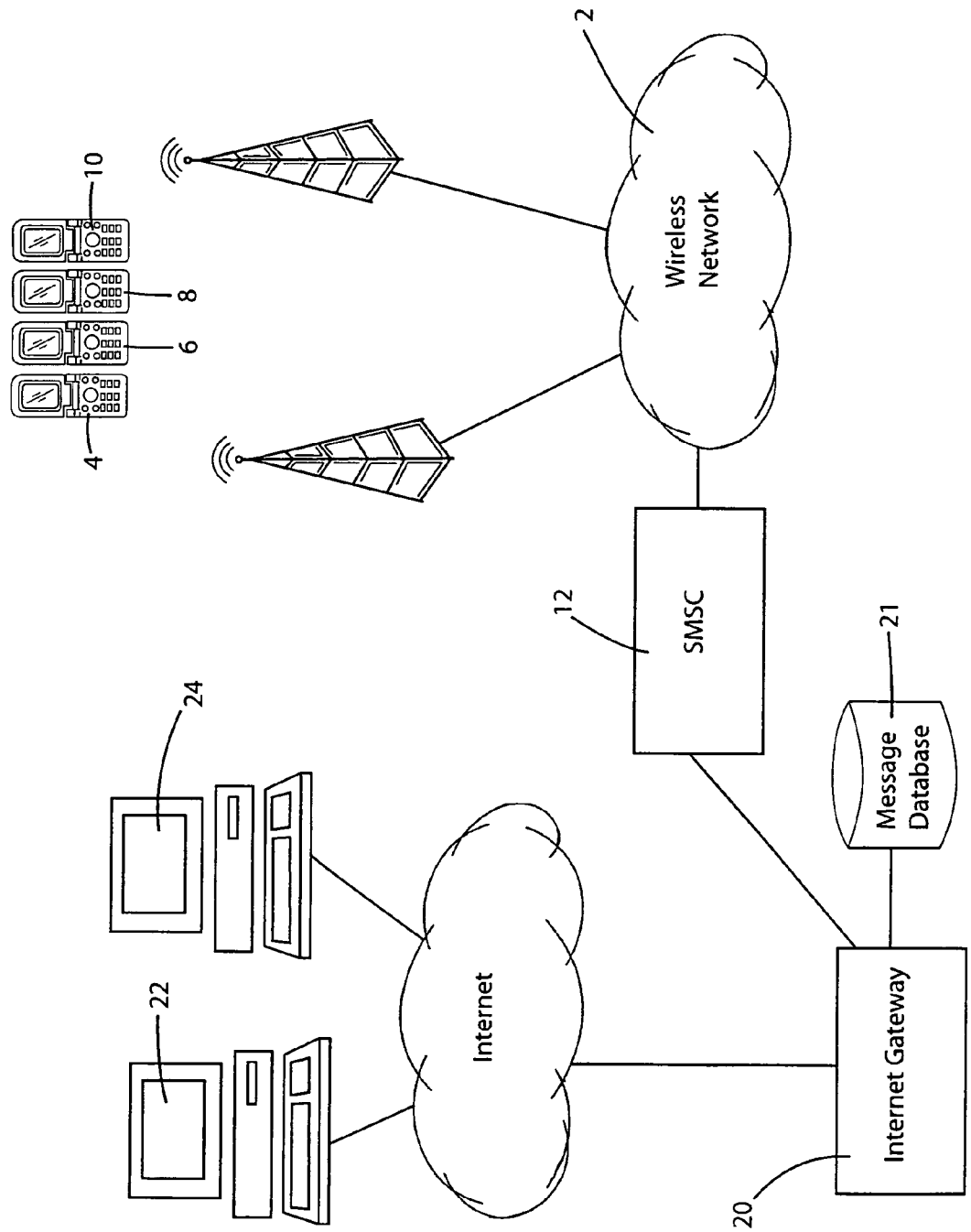
FIG. 1 is a block diagram illustrating an embodiment of the Internet-based mobile messaging log system of the present invention.

Referring now to FIG. 1, therein is shown, in block diagram form, an embodiment of the Internet-based mobile messaging log system of the present invention.

As shown in FIG. 1, the system includes a wireless network 2 and its constituent components as maintained by a wireless carrier, e.g., Verizon Wireless®. The system of FIG. 1 further includes a plurality of SMS-capable mobile devices, e.g., SMS-capable mobile phones 4, 6, 8 and 10, that have the ability to send and receive SMS messages through wireless network 2.

Wireless network 2 includes a short message service center (SMSC) 12 (shown for the purposes of clear illustration as outside the wireless network), which relays, stores and forwards SMS messages between SMS-capable devices. Only one SMSC is illustrated in FIG. 1 for purposes of simplifying the explanation of the inventive system and method. However, one skilled in the art will appreciate that an SMS network includes a multiplicity of SMSCs that are geographically spread throughout the wireless network to accommodate SMS message traffic.

Other well known components (not illustrated) of wireless network 2 include one or more of each of the following: 1) a mobile switching center (MSC) which controls calls to and from other telephone and data systems by performing switching functions for wireless network 2; 2) a home location register (HLR), which provides routing information to facilitate communication; 3) an SMS gateway mobile switching center (SMS-GMSC) which is an MSC that receives SMS messages from an SMSC, interrogates an HLR for routing information, and delivers the SMS messages to the MSC of a recipient mobile user; and 4) an SMS internetworking mobile switching center (SMS-IMSC) which is utilized to receive SMS messages from wireless network 2 and submit them to the appropriate SMSC 12.

Additionally, wireless network 2 includes elements of the SS7 signaling network that facilitate communication between the SMS network and other wireless network components.

Having described the known features and operation of the system illustrated in FIG. 1, the salient components and aspects of the present invention will now be described.

With continued reference to FIG. 1, an Internet Gateway 20 interconnects the Internet with wireless network 2. As such, Internet Gateway 20 acts as a conduit for sending and receiving messages to and from the Internet and wireless network 2, respectively. More particularly with respect to the present invention, Internet Gateway 20 passes messages sent to SMS-capable devices 4, 6, 8 and 10 from Internet-capable personal computers 22 and 24 and also passes replies from SMS-capable devices 4, 6, 8 and 10 back to Internet-capable personal computers 22 and 24. At the same time, Internet Gateway 20, in cooperation with message database 21, maintains a log of the messages and replies that the users may later retrieve and review.

Although personal computers 22 and 24 are illustrated in FIG. 1 as being physically connected to the Internet, one skilled in the art will appreciate that the present invention is equally applicable to use with microprocessor-based devices that connect to the Internet using wireless technology, e.g., laptop computers or Palm® hand-held computing devices that utilize a wireless modem μ-based devices in general. Moreover, the present invention is likewise applicable to use with information networks other than the Internet, e.g., private, fee-based information networks such as America Online® and CompuServe®.

Internet Gateway 20 is known in the art as a device that is capable of facilitating communications between devices connected to the Internet and other devices located outside the Internet. In the system of FIG. 1, Internet Gateway 20 communicates with the SMS network via SMSC 12 using known protocol standards for transmitting short messages into and out of wireless network 2. Preferably, the Short Message Point-to-Point Protocol (SMPP) version 3.4, which is hereby incorporated herein by reference in its entirety, is utilized.

Any known microprocessor-based server platform running any known server operating system and programmed as described herein may be utilized to implement Internet Gateway 20. Internet Gateway 20 connects to the Internet and SMSC 12 using any of the various known telecommunications interconnections, e.g., leased T-1, 56 kb or ISDN lines, as required by the amount of expected messaging traffic and the desired performance of the system.

Alternatively, Internet Gateway 20 may be co-located with SMSC 12. Moreover, to increase efficient operation of the present invention, Internet gateway 20 preferably serves more than one SMSC 12. In this manner, various SMSCs located throughout wireless network 2 are remotely connected to a single or a minimal number of Internet Gateways, thus reducing the cost of implementing the present invention.

Internet Gateway 20 additionally includes web hosting hardware and software that allows presentation of a web interface to Internet users 22 and 24. The web interface provided by Internet Gateway 20 preferably consists of one or more web pages accessed using the Internet Protocol and written in HTTP, Java or other known web-based languages.

In addition to being connected to the Internet and wireless network 2, Internet Gateway is also connected to a message database 21. Although represented in FIG. 1 as a separate physical entity, it should be understood that the functionality of message database 21 may be included within Internet Gateway 20. For example, Internet Gateway 20 may be programmed to run database software, e.g., Oracle 9i database. Alternately, message database 21 may be housed in a separate server as illustrated in FIG. 1.

Internet Gateway 20, in cooperation with message database 21, maintains an account for each user of the messaging log system. The accounts are accessed via the World Wide Web in a conventional manner utilizing user names and passwords. As will be fully explained below, the message log system of the present invention maintains and presents a record of the messages sent and replies received by the Internet-based user over the SMS network. Each user accesses his message log via Internet Gateway 20.

Accordingly, as a preliminary step to utilizing the present system and message, the user of the message log system first accesses a general introduction web page presented by Internet Gateway 20 and establishes a personal account by selecting a user name and password so that the user may later securely access the information contained in his account. While the front-end web pages are served to the users by Internet Gateway 20, the information contained in the accounts is maintained by message database 21.

Figure 2:
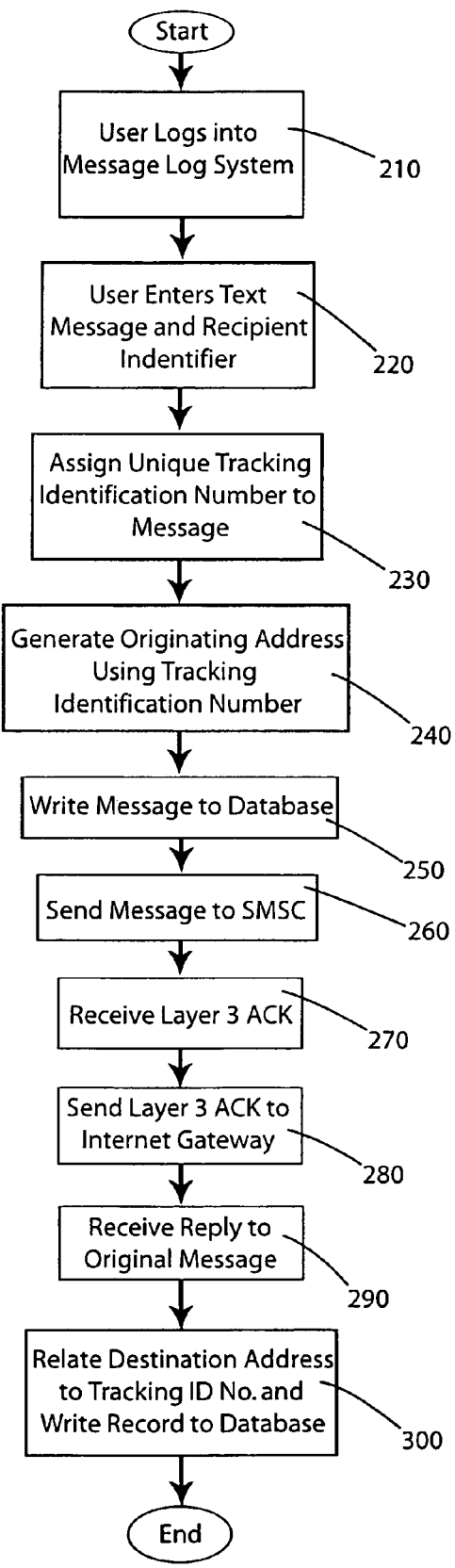
FIG. 2 is a flowchart of the mobile messaging log creation process.

FIG. 2 illustrates in flow chart format, a method of operation of the Internet-based mobile messaging log of FIG. 1 in accordance with the present invention.

At step 210, the user of an Internet-enabled personal computer, e.g., 22 or 24, logs into the messaging log system of the present invention by accessing Internet Gateway 20 via the World Wide Web and entering the user's user name and password corresponding to his account to gain access to the system and to allow the system to identify the user and therefore maintain proper records.

At step 220, upon prompting by the accessed web page of Internet Gateway 20, the user enters a text message for an intended SMS-capable mobile device recipient, e.g., 4, 6, 8 or 10. The user then identifies the recipient device by entering a telephone number, user name or any other identifier of the intended SMS-capable mobile device recipient. The user then sends the message to the Internet Gateway 20 (and ultimately to the SMS-capable device) by pressing a "send" or "submit" button provided by the accessed web page.

At step 230, the sent message arrives at Internet Gateway 20. Internet Gateway 20 assigns a unique tracking identification number to the message and associates the unique tracking identification number with the user who sent the message. The tracking identification number may be of any form or combination of numbers and/or letters. As an example, the identification tracking number for a particular message may be "238723". The identification number is used by the message log system to track the sent message and its reply and to correlate the sent message and reply with the proper record in the message log as maintained in message database 21.

At step 240, the system generates an origination address of the message using the tracking identification number created in step 230. As an example, the origination address may be in the form "REPLYIDXXXXXX@v.w" where "XXXXXX" indicates a placeholder for the identification tracking number and "v.w" is the domain name identifier of Internet Gateway 20. Continuing with the example above where the unique tracking identification number is "238732", the origination address would be "REPLYID238732@v.w". As will be explained, the originating address will be used as the destination address by the recipient SMS-capable mobile device when replying to the message.

At step 250, the system writes a new record to database 21 for the present message being processed. The system records the message itself and the tracking identification number in the new record. The system also records the time that the message was sent by the user to the Internet Gateway 20 for delivery as well as the identification of the sender of the message in the form of the user name. Additional blank entries are maintained in the record for the status of the message, the reply to the message and the time the reply to the message was sent by the recipient. These blank entries are filled as the process of FIG. 2 progresses.

At step 260, Internet Gateway 20 sends the message to the SMS network by delivering the message to SMSC 12 using known SMPP protocol calls. In this manner, Internet Gateway 20 acts as a short message service entity (SMSE). The destination address of the SMS message is the same as that specified by the user. The origination address of the message is the "REPLYIDXXXXXX@v.w" address discussed above. Upon receiving the message, SMSC 12 then passes the message to the intended recipient over the SMS network in the normal manner.

At step 270, SMSC 12 receives the Layer 3 ACK message as specified in EIA/TIA IS-637A and EIA/TIA IS-637-B, which are hereby incorporated herein by reference in their entirety. EIA/TIA IS-637-A and EIA/TIA IS-637-B are known standards that define SMS network operation. The Layer 3 ACK message informs SMSC 12 that the message has been received by the intended recipient and further specifies the time and date when the message was received.

SMSC 12 is programmed to pass Layer 3 ACK information to Internet Gateway 20 at step 280. Internet Gateway 20 then correlates the received information with the corresponding record in database 21 and writes the information (i.e., reply acknowledgment and reply date/time information) to the appropriate record.

At step 290, SMSC 12 receives a reply to the original message from the recipient. The destination address of the reply message is the "REPLYIDXXXXXX@v.w" address discussed above. SMSC sends this message (as it does all messages addressed to "v.w") to Internet Gateway 20.

At step 300, Internet Gateway 20 relates the destination address to the unique tracking identification number and writes the reply to the corresponding record maintained in database 21.

Internet Gateway 20 then preferably notifies the originator of the message (22 or 24) that a reply to the message has been received.

Having described a procedure by which the messaging log maintains a record of messaging activity, a method by which a user of the system accesses their message log will now be described.

Internet server 20 presents a web page that requests the user to enter their unique user name and password. Internet Gateway 20, in cooperation with message database 21, receives and verifies the identifying information of the user. Internet server 20 then presents a menu of options to the user. One option salient to the present invention is 'Review Sent Messages' or an equivalent menu option by which the user requests to view their messages.

FIG. 3 illustrates an exemplary web page presented by Internet server 20 in response to selecting the menu option 'Review Sent Messages' wherein a listing of messages sent by a particular user is shown. In this example, the information presented was obtained from message database 21 by searching message database 21 for all entries where the sender of the message is identified as 'Jim_Smith'. In other words, message log 302 of FIG. 3 provides a listing of all messages sent by the user having the user name identification 'Jim Smith'. A similar message log can be created for messages sent by other users. Such a log would be created by searching message database 21 for all entries where the sender of the message is identified by the particular user name.

With continued reference to FIG. 3, the information provided in message log 302 includes: the message itself 304, the date and time when the message was sent 306, the identification of the recipient of the message 308, the status of the message 310, the time and date when the message was delivered to the recipient 312, and the reply, if any, to the message 314.

Thus, as described above, the present invention allows a user to access a complete record of the messages sent (and respective replies) from his Internet-based personal computer to SMS-capable mobile devices.

While the invention has been particularly shown and described with reference to preferred embodiments thereof, it will be understood by those skilled in the art that various changes in form and details may be made therein without departing from the spirit and scope of the invention.

We claim:

1. A method for tracking messages delivered via a short message service (SMS) comprising the steps of:

receiving, at a gateway, a message destned for a mobile device;

assigning a unique identifier to the received message;

recording the received message and the unique identifier to a record in a database accessible to the gateway;

forwarding the received message from the gateway to the mobile device, wherein the forwarded message sent from the gateway to the mobile device includes an origination address, the origination address being derived from the unique identifier;

receiving, at the gateway, a reply to the message from the mobile device;

correlating the reply to the sent message by means of the unique identifier;

recording the correlated reply in the database record storing the sent message; and allowing either of a sender or a recipient of the message to log in to the gateway to retrieve the database record to access and view each of the received message and the reply.

2. The method of claim 1, wherein the forwarding step includes the step of sending the message to a short message service center (SMSC).

3. The method of claim 1 wherein the sender of the message received at the gateway communicates with the gateway via the Internet.

4. The method of claim 1, wherein the gateway is an Internet Gateway identified by a domain name, the domain name being included in the origination address of the message sent from the gateway to the mobile device.

5. The method of claim 1, wherein the origination address of the message sent from the gateway to the mobile device includes the unique identifier.

6. The method of claim 1, wherein the destination address of the reply sent to the gateway is the origination address of the forwarded message.

7. The method of claim 1, wherein the message and reply are accessed using a web browser.

8. A system for recording a message sent from a first communication device connected to a first network to a second communication device connected to a second network, the system comprising:

a database and a gateway, the database connected to the gateway and the gateway connected to the first and second network, the gateway including a microprocessor which is programmed to:

receive the message sent from the first communication device destined for the second communication device, assign a unique identifier to the message, record the message and unique identifier to a record in the database, forward the message to the second communication device connected to the second network, wherein the origination address of the forwarded message is derived from the unique identifier;

receive a reply to the message from the mobile device;

correlate the reply to the sent message by means of the unique identifier;

record the correlated reply in the database record storing the sent message; and allow a user of either of the first or second communication devices to log in to the gateway to retrieve the database record to access and view each of the message and the reply.

9. The system of claim 8, wherein the first network is the Internet and the second network is the short message service (SMS) network.

10. The system of claim 8, wherein the first communication device is a personal computer and the second communication device is a mobile device.

11. The system of claim 8, wherein the first communication device communicates with the gateway via the Internet using a web browser.

12. The system of claim 8, wherein the second network is a short message service (SMS) network and the gateway is connected to a short message service center (SMSC).

* * * * *